United States Patent [19]

Masaki

[11] Patent Number: 4,787,073

[45] Date of Patent: Nov. 22, 1988

[54] DATA PLAYBACK SYSTEM FOR RANDOM SELECTIONS

[75] Inventor: Naoki Masaki, Saitama, Japan

[73] Assignee: Pioneer Electronic Corporation, Tokyo, Japan

[21] Appl. No.: 899,355

[22] Filed: Aug. 22, 1986

[30] Foreign Application Priority Data

Aug. 22, 1985 [JP] Japan ................... 60-185492
Aug. 22, 1985 [JP] Japan ................... 60-185493

[51] Int. Cl.⁴ ................ G11B 17/22; G11B 27/28
[52] U.S. Cl. ........................... 369/32; 369/34; 369/41; 360/69
[58] Field of Search .................. 369/30–39, 369/41, 44, 45, 63–66, 178, 180, 184, 189, 190–195, 233, 239; 360/69, 72.1, 75

[56] References Cited

U.S. PATENT DOCUMENTS

| | | | |
|---|---|---|---|
| 3,575,559 | 4/1971 | Tierney | 360/69 |
| 3,625,519 | 12/1971 | Danielsen et al. | 369/30 |
| 4,180,838 | 12/1979 | Fehrenkamp | 360/72.1 |
| 4,527,265 | 7/1985 | de Costemore d'Arc | 369/233 |
| 4,539,663 | 9/1985 | Ishibashi et al. | 369/34 |
| 4,667,314 | 5/1987 | Iwashima | 369/32 |

FOREIGN PATENT DOCUMENTS

2821604 11/1979 Fed. Rep. of Germany ..... 360/72.1
2062935 5/1981 United Kingdom .............. 369/34

*Primary Examiner*—Raymond F. Cardillo
*Assistant Examiner*—Steven R. Garland
*Attorney, Agent, or Firm*—Sughrue, Mion, Zinn, Macpeak & Seas

[57] ABSTRACT

In a data playback system in which multiple disks are stored in a magazine, a first random number is generated to select one of the disks believed to be present in the magazine, or temporarily, on the turntable. A disk fetch is attempted and it is determined from the success of the fetch whether or not the disk is present. If not, a memory is updated to eliminate such disk from a catalog and disk selection is repeated. Then a table of contents is read, either from the disk or from a previously written random access memory. A second random number selects a block of data on the selected disk for playback. If the table of contents is stored in random access memory, it is completed as the information becomes available. Then the process is repeated for other randomly selected disks and data blocks.

7 Claims, 3 Drawing Sheets

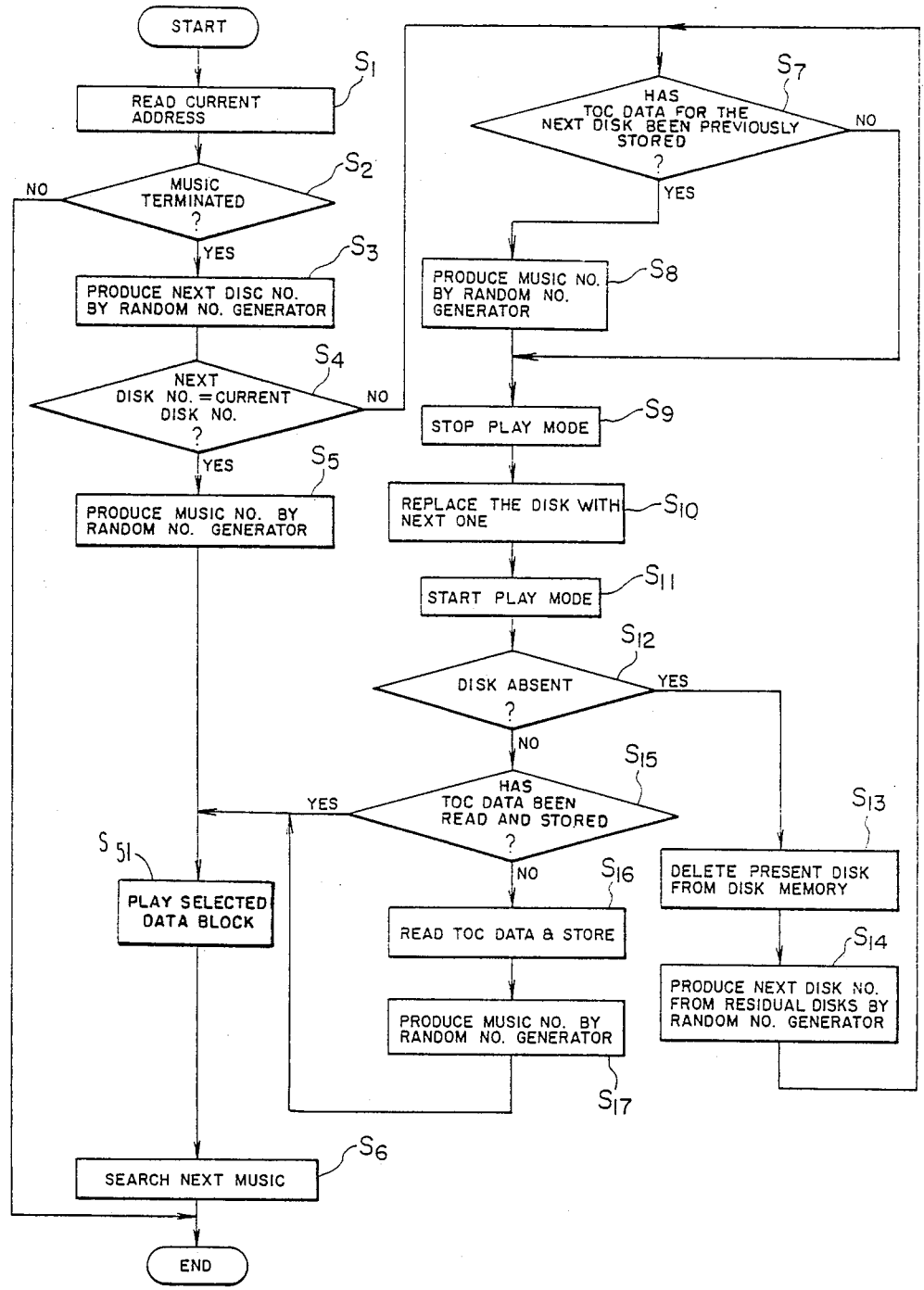

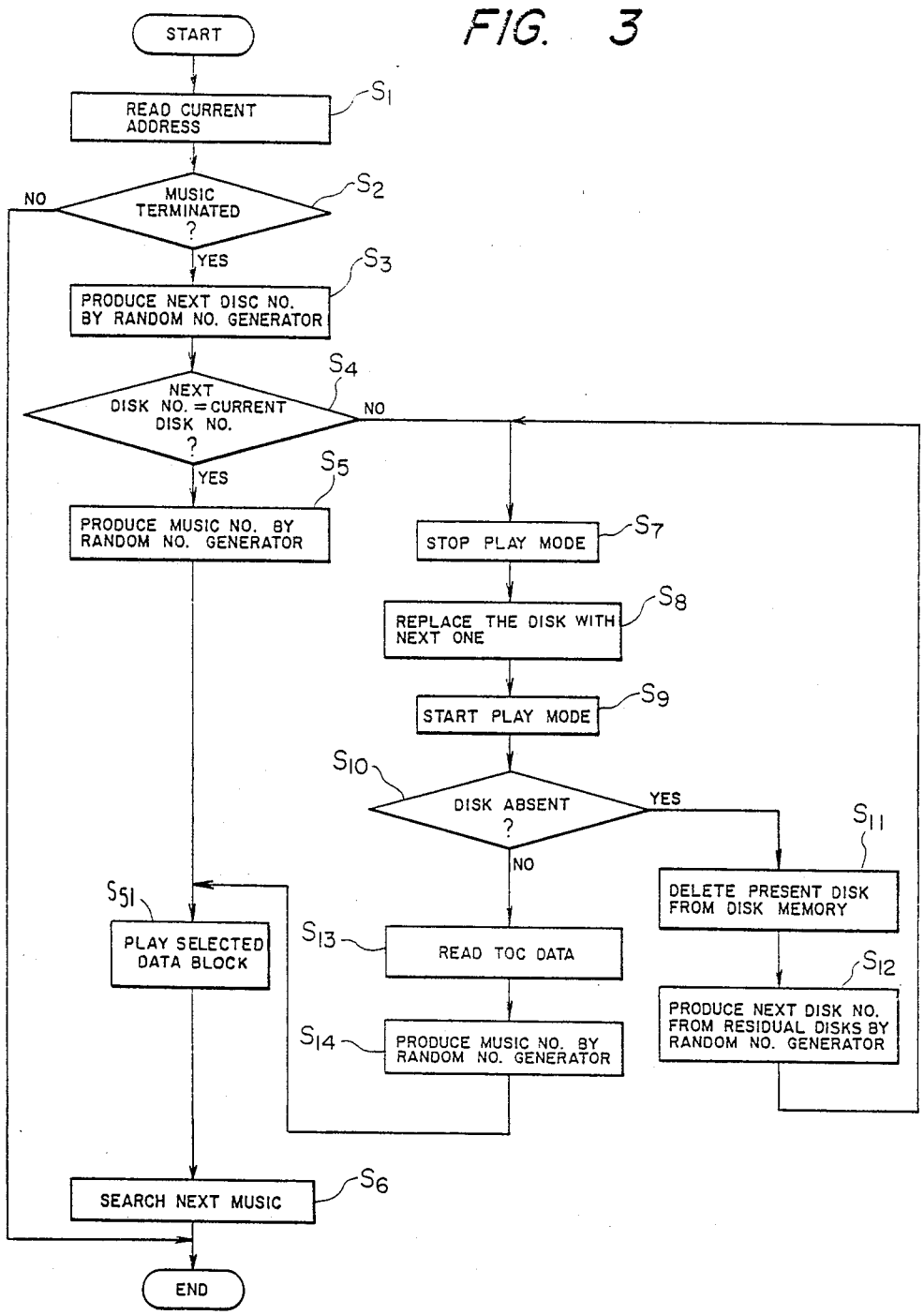

DATA PLAYBACK SYSTEM FOR RANDOM SELECTIONS

BACKGROUND OF THE INVENTION

1. Field of the Invention

This invention relates to a data playback system particularly applicable to a player having a plurality of storage locations for storing different recording disks and which is used for successively playing back data recorded on the disks contained in these locations.

2. Background Art

There are conventional data playback systems such as jukeboxes or recently developed multidisk players which are capable of normally storing a plurality of recording media including disks including those known as digital audio disks (DADs) and which continuously plays back the data recorded on the disks. In these conventional systems, there has been employed a system for successively playing back prearranged pieces of music in prearranged order.

When such a data playback system operating according to the conventional data playback scheme is used in a game of, e.g., name-that-tune, the order of playing back the musical pieces will be known beforehand, which spoils the enjoyment. The same problem occurs in testing for foreign language phrases.

SUMMARY OF THE INVENTION

An object of the present invention is to provide a playback system capable of randomly setting the order of playing back data recorded on a plurality of recording media.

A first embodiment of the present invention is characterized by a process for selecting one of the remaining recording disks among those stored at a plurality of locations using random numbers. However, the numbers which are assigned to disks which have previously been found to be missing from their proper locations are excluded. Another process selects one of a group of data (selections) recorded on the disk using random numbers, but only when the number of such data in the group and their locations are already known through a prior discriminating process performed on the selected disk. A discriminating process determines whether or not the recording disk selected is presently available and carries out further processing accordingly. The discriminating process detects and stores the number of selections in the group and their recorded positions only when this data is unknown and, after playing back the data selected through the data selection process, subsequently repeats the selection processes and plays back a further selection.

A second embodiment of the present invention is characterized by a process for selecting one of the remaining recording media using random numbers for the stored disks, excluding the disks noted as being absent either in this or a previous operation. The process determines whether or not the selected recording disk is present. When the recording selected disk is absent, the process records the fact that the recording disk is absent and again carries out the process for selecting one of the remaining recording media. The process detects the number of data (selections) stored on the recording medium and their positions when the selected recording disk is present and, after selecting and playing back one of the selections chosen using random numbers, again carries out the selection processes and plays back a further selection.

BRIEF DESCRIPTION OF THE DRAWINGS

FIG. 2 is a flowchart showing the operation of the first embodiment of the present invention.

FIG. 3 is a flowchart showing the operation of the second embodiment of the present invention.

DETAILED DESCRIPTION OF THE PREFERRED EMBODIMENTS

Figure 1:
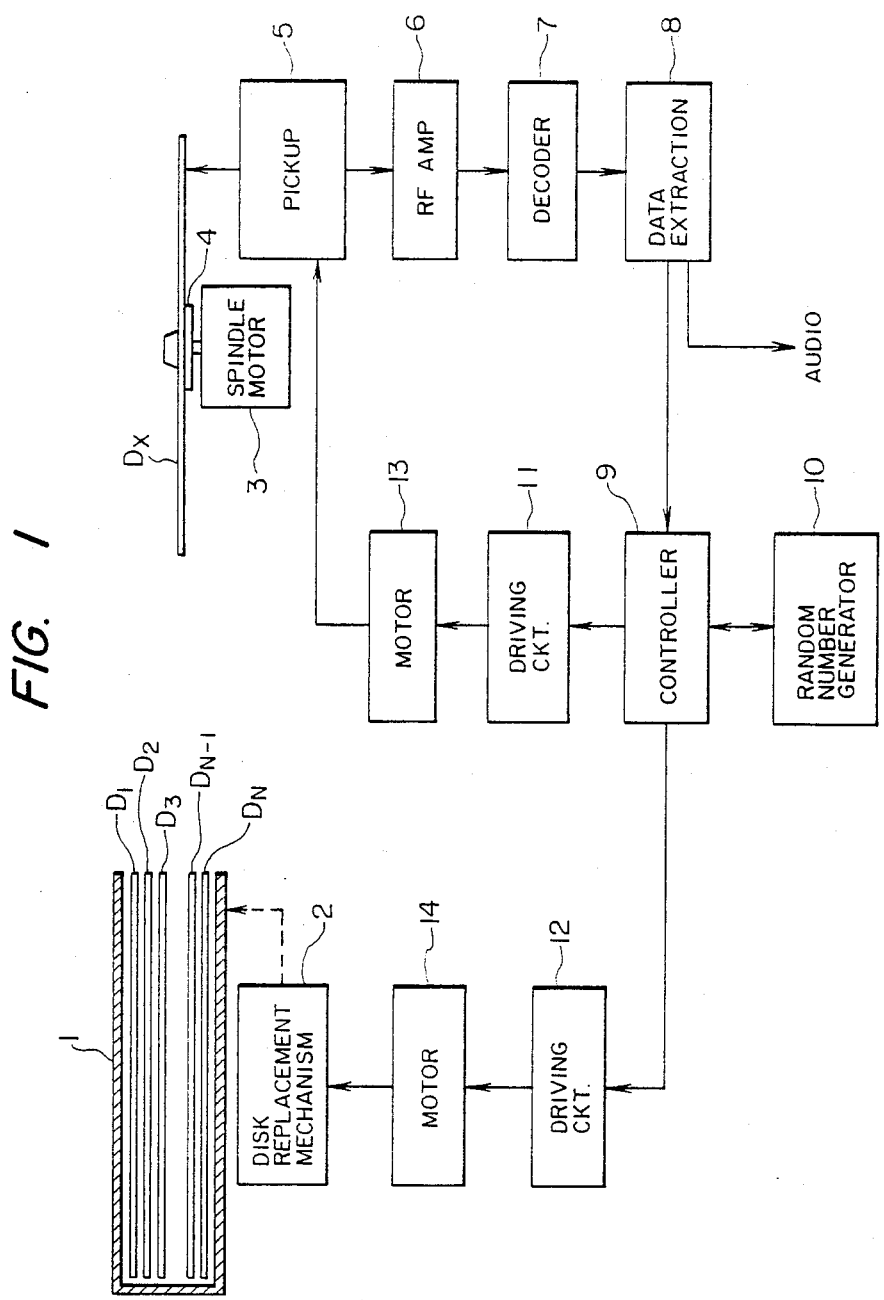
FIG. 1 is a block diagram of an embodiment of the present invention.

Referring to the accompanying drawings, two embodiments of the present invention will be described. Both embodiments use similar circuits but in different processes.

As shown in FIG. 1, a magazine 1 capable of arranging and containing a plurality of disks in a given order and at a fixed pitch is detachably fitted to a player. In the magazine 1, disks $D_1$–$D_N$ are respectively held in position. One disk $D_x$ of the disks $D_1$–$D_N$ is carried by a disk replacement mechanism 2 onto the disk-loading surface of a turntable 4 fixed to the rotary shaft of a spindle motor 3 before being and clamped thereon. The data recorded on the disk $D_x$ clamped on the disk-loading surface of the turntable 4 is read out by a pickup 5. The pickup 5 contains a laser diode, an objective lens, a focus actuator, a tracking actuator, a photo-detector, and other well known elements. The focus actuator and the tracking actuator contained in the pickup 5 are driven by an error signal, which is formed from the output of the pickup 5 by a focus servo circuit and a tracking servo circuit (not shown). The output of the pickup 5 is supplied to a decoder circuit 7 through an RF amplifier 6. The decoder circuit 7 consists of, e.g., an EFM (eight-to-fourteen modulation) circuit. The data decoded by the decoder circuit 7 is supplied to a data extraction circuit 8 where it is split into two parts. The first part contains control data indicating the piece of music being played back, the intermission between the pieces on the disk, the music program number, the duration of play and an address. The second part contains audio data. The audio data is converted by a D/A converter (not shown) into an audio output, whereas the control data is supplied to a controller 9.

The output of a random number generator circuit 10 and instructions concerning the random music selection mode are supplied to the controller 9. The random number generator circuit 10 is so arranged as to latch and then generate the output of a counter whose value sequentially changes in an extremely short cycle in response to the instructions given by the controller 9. Moreover, the controller 9 is formed of a microcomputer comprising a processor, a ROM (Read Only Memory) and a RAM (Random Access Memory), and issues instructions to the random number generator circuit 10, a motor driving circuit 11, a disk replacement driving circuit 12 and various servo circuits. According to these instructions, the motor driving circuit 11 supplies driving current to a motor 13 for moving a slider (not shown) loaded with the pickup 5 in the radial direction of the disk $D_x$ and the disk replacement driving circuit 12 supplies driving current to a motor 14 for driving the disk replacement mechanism 2.

In the controller 9 thus constructed two possible processes will be described for the two embodiments of the invention. In the first embodiment, the following process is executed by the processor operating in accordance with a program pre-stored in the ROM. First it is detected that the random music selection mode has been selected. For instance, an operating system in a main program routine pre-stored in the ROM may detect the command which changes a state flag to one. This command is an initiating instruction for the random music selection mode. Then, the execution of the subroutine shown in FIG. 2 is started. The controller 9 reads out the address data extracted from the data extraction circuit 8 (Step $S_1$ in FIG. 2), thus judging whether or not any music currently being played back has terminated by comparing the address data with what has previously been stored (Step $S_2$). The controller 9 will restart the process of executing the main routine unless the music being played back has terminated. When the music being played back has terminated, the controller 9 selects one of a plurality of disk numbers respectively representing the remaining disks and excluding any disks already known to be missing. This random selection process uses the data obtained by issuing instructions to the random number generator circuit 10 (Step $S_3$). The process in Step $S_3$ may be carried out as follows. The number of disks recorded by the controller 9 in its RAM as being contained in the magazine 1 is first counted (given as the value n). The controller 9 first latches the output X of the random number generator circuit 10, whose value sequentially changes in an extremely short cycle. Then the controller repeatedly subtracts the value n from the latched random output until the subtraction can no longer produce a non-negative balance. The last positive balance m equals the residue m resulting from the modular division of X by n. One is added to m and any (m+1) is a random number between 1 and n. Then the disk numbers of the disks contained in the magazine 1 are sequentially counted in order up to (m+1) to thereby select one random disk number out of those of the disks contained therein.

Subsequently, the controller 9 determines whether or not the disk number thus selected is the disk number of the disk which is currently being replayed (Step $S_4$). When the disk numbers are identical, the controller 9 uses the random number generator circuit 10 to form a music number representing one of the pieces of music recorded on this disk (Step $S_5$). The process in Step $S_5$ can be implemented as follows. The controller 9 first calculates the number of pieces of music on the disk (given as the value P) from the data on the starting musical number and the last musical number stored in the data of the TOC (table of contents). The TOC indicates the number of pieces of music recorded on the disk and their recorded positions. The value P is then repeatedly subtracted from the output y of the random number generator circuit 10 until subtraction can no longer produce a non-negative number. The last non-negative balance equals the residue q resulting from the modular division of y by P. The starting musical number (STNO) stored in the TOC is added to q and q+STNO is a random number covering the music numbers from the start music number up to the last music number recorded on the disk.

The controller 9 subsequently gives instructions to the motor driving circuit 11 and the various servo circuits (Step $S_6$) to allow the playback of music corresponding to the thus generated random music number. The process can be repeated by a return to the main routine.

When in Step $S_4$ the random disk number thus generated is unequal to the number of the disk being currently replayed, the controller 9 determines whether or not the TOC data recorded on the innermost periphery of the disk identified by the randomly generated disk number has been previously read out by the controller 9 (Step $S_7$). Provided that the TOC data has been read out, the controller 9 randomly generates one of the music numbers (Step $S_8$) using the same procedure as that described for Step $S_5$, where each number represents one recorded piece. Then, in either case, the controller 9 instructs the various servo circuits to stop the playback operation of the disk being currently played (Step $S_9$). The controller 9 immediately carries out the stopping procedure in Step $S_9$ even when the TOC data has not yet been read.

The controller 9 subsequently instructs the disk replacement driving circuit 12 (Step $S_{10}$) to cause the current disk being replayed to be carried to the magazine 1 and the disk having the number corresponding to the newly generated random number of Step $S_3$ to be carried to the disk loading surface of the turntable 4 and clamped thereon. The controller 9 then instructs the various servo circuits to start their servo mechanisms (Step $S_{11}$) and determines the presence or absence of the disk depending on whether or not the focus servo is in the locked condition within a fixed period of time (Step $S_{12}$). If the desired disk is not contained in the magazine 1, the controller 9 stores the fact of the absence of the disk having this disk number in an area of the RAM memory where disk presence or absence indications are stored (Step $S_{13}$). The controller 9 then generates, just as in the case of Step $S_3$, another disk number representing a disk that should properly be contained in the magazine 1, excluding the one already noted as being absent (Step $S_{14}$) and again commences the process in and after beginning with step $S_7$.

When the presence of the disk is confirmed by the test of Step $S_{12}$, the controller 9 determines whether or not the TOC data of this disk (having the disk number generated in Step $S_3$ or Step $S_{14}$) has been read out (Step $S_{15}$). If the TOC data has already been read out, or, if not, after this data is read and stored ($S_{16}$) and a random selection chosen ($S_{17}$), the controller 9 gives instructions to the motor driving circuit 11 and the various servo circuits, causing the piece having the music number generated in Step $S_8$ or Step $S_{17}$ to be played back (Step $S_{51}$), and subsequently commences the process after Step $S_{51}$.

As set forth above, the data playback system according to the first embodiment is designed to select and play back one of the pieces of recorded music by means of a random number selection scheme after selecting one of the disks and detecting the number of pieces recorded on the selected disk. In consequence, the order of the pieces to be played back is randomized as in the game of name-that-tune so as not to impair enjoyment. Moreover, the data playback system according to the present invention allows any disk found absent to be noted and prevented from being chosen again. A musical number for subsequent playback is immediately selected provided the number of pieces recorded on the chosen disk has already been inputted, and the number of recorded pieces does not need to be inputted again. Accordingly, the operation of searching out the next piece to be played back can be conducted immediately after the termination of the current played back so that continuous playback can be smoothly implemented without a waste of time, with the playback order set at random.

Referring to the flowchart of FIG. 3, another embodiment of the present invention will now be described. Since the main routine comprising the Steps $S_1$–$S_6$ shown in FIG. 3 is the same as is shown in FIG. 2, the description thereof will be omitted.

When the disk number generated in Step $S_4$ is not the same as that of the disk currently being played back, the controller 9 issues instructions to various servo circuits in such a manner as to stop the playback operation of the disk being played back (Step $S_7$ in FIG. 3). The controller 9 subsequently instructs the disk replacement driving circuit 12 so as to convey the disk being played back to the magazine 1, and to carry and clamp the disk having the newly generated disk number onto the disk-loading surface of the turntable 4 (Step $S_8$). The controller 9 then instructs the various servo circuits to start their servo-mechanisms (Step $S_9$) and judges whether or not the disk is present according to whether or not the focus servo is locked within a fixed period of time (Step $S_{10}$). In case no disk corresponding to the random number is contained in the magazine 1, the controller 9 will store the fact of the absence of the disk having the newly generated random disk number in the area set of the RAM memory which stores indications of the presence or absence of a disk (Step $S_{11}$). The controller 9 then generates, as in the case of Step $S_3$, another disk number representing a disks that should properly be contained in the magazine 1, excluding the one already recorded as being absent (Step $S_{12}$) and again commences the process in and after Step $S_7$.

When the presence of the disk is confirmed by the test of Step $S_{10}$, the controller 9 obtains the TOC data recorded on the innermost periphery of the disk from the data extraction circuit 8 (Step $S_{13}$).

Subsequently, the controller 9 generates, as in the case of Step $S_5$, a music number representing one of the pieces recorded (Step $S_{14}$) and conducts the playing process in and after Step $S_{51}$.

As set forth above, the data playback system according to the present invention allows the individual piece of music to be selected after the number of pieces of music recorded on the selected disk is detected. Thus a nonexistent pieces is thus avoided, preventing wasteful operation.

Although a description has been given of a multidisk player capable of containing a plurality of DAD's and continuously playing them back, the present invention is also applicable to systems capable of containing a plurality of video cassettes or cassette tapes and continuously playing them back. In this case, the piece of music, etc. should be selected by producing proper random numbers when the number of pieces of recorded music is unknown beforehand and a piece should be selected by issuing generation of proper random numbers again when the selected ion chosen as the result of the search is found to be absent.

What is claimed is:

1. A data playback process in which data blocks recorded on a plurality of recording media are randomly selected and reproduced, comprising;
   (a) providing a data playback apparatus having a plurality of storage locations, each for accommodating one of said recording media,
   (b) selecting a recording medium by generating a first random number associated with one of said recording media, the presence of said selected medium in said plurality of storage locations being initially unknown,
   (c) determining if said selected recording medium is present in one of said locations,
   (d) in response to a determination that said selected recording medium is present, determining the number of data blocks recorded on said selected medium and their respective locations thereon,
   (e) selecting a data block by generating a second random number associated with one of said number of data blocks recorded on said selected medium, and
   (f) playing said selected data block recorded on said selected medium.

2. A process as recited in claim 1, wherein said step of determining the number of data blocks comprises the steps of:
   discriminating whether said number of said data blocks recorded on said selected medium and their respective locations thereon are known; and
   reading and storing said number of said data blocks and their said respective locations from said selected recording medium if said discriminating step discriminates that said number of data blocks and their said respective locations are not known.

3. A process as recited in claim 2, further comprising:
   determining that said playing step has been completed; and
   then repeating said steps (b), (c), (d), (e) and (f).

4. A process as recited in claim 2, wherein said reading and storing step stores said number of data blocks and their said respective locations in random access memory and wherein said step of determining the number of data blocks includes reading from said random access memory said number of data blocks recorded on said selected medium and their respective locations thereon if said discriminating steps discriminates that said number of data blocks and their said respective locations are known.

5. A process as recited in claim 1, further comprising:
   determining that said playing step has been completed; and
   then repeating said steps (b), (c), (d), (e) and (f).

6. A process as recited in claim 1, wherein said medium presence determining step comprises detecting the status of a focus servo after the elapse of a predetermined time.

7. A process as recited in claim 1, wherein said medium presence determining step includes the step of storing an indicator of the absence of said selected medium from said plurality of storage locations in a random access memory.

* * * * *